J. S. STEARNS.
TRACTOR DRIVING GEARING.
APPLICATION FILED JULY 15, 1915.
1,196,168.
Patented Aug. 29, 1916.
2 SHEETS—SHEET 1.
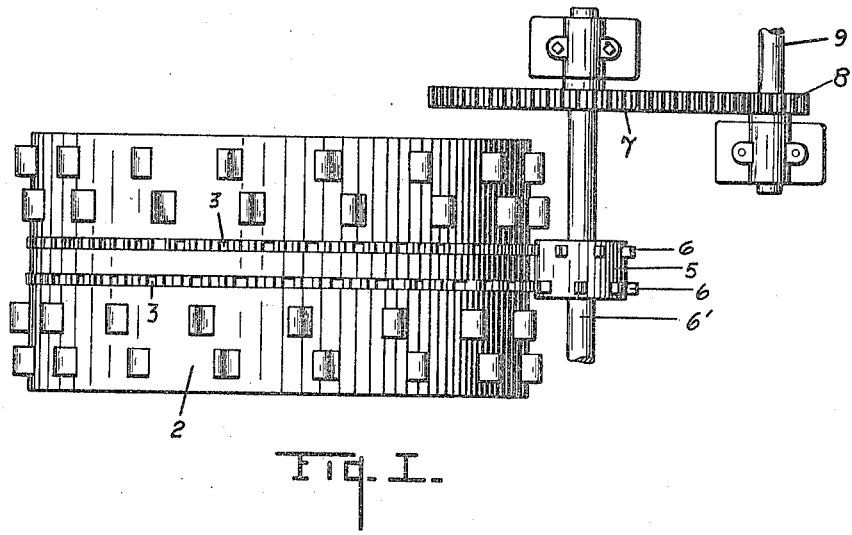
Fig. I.
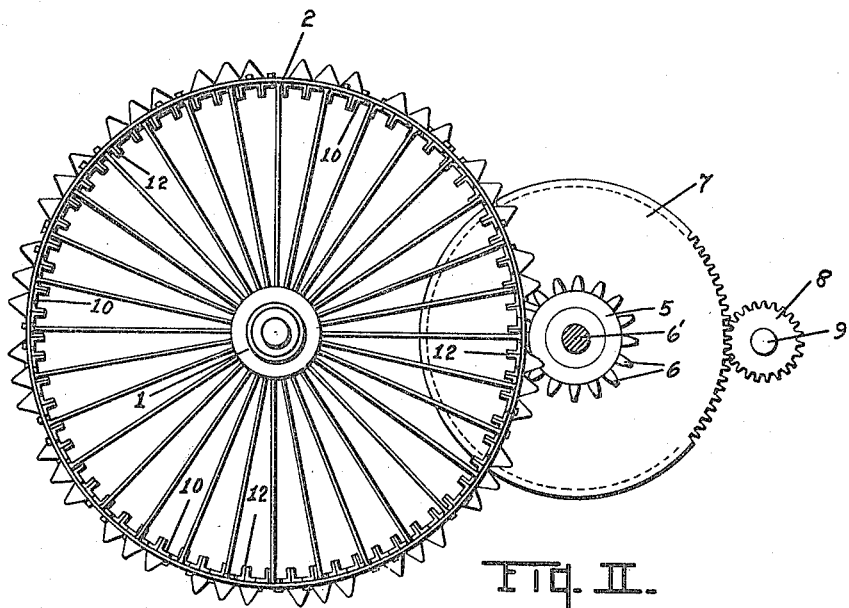
Fig. II.
WITNESSES:
INVENTOR
Justus S. Stearns
BY
ATTORNEYS

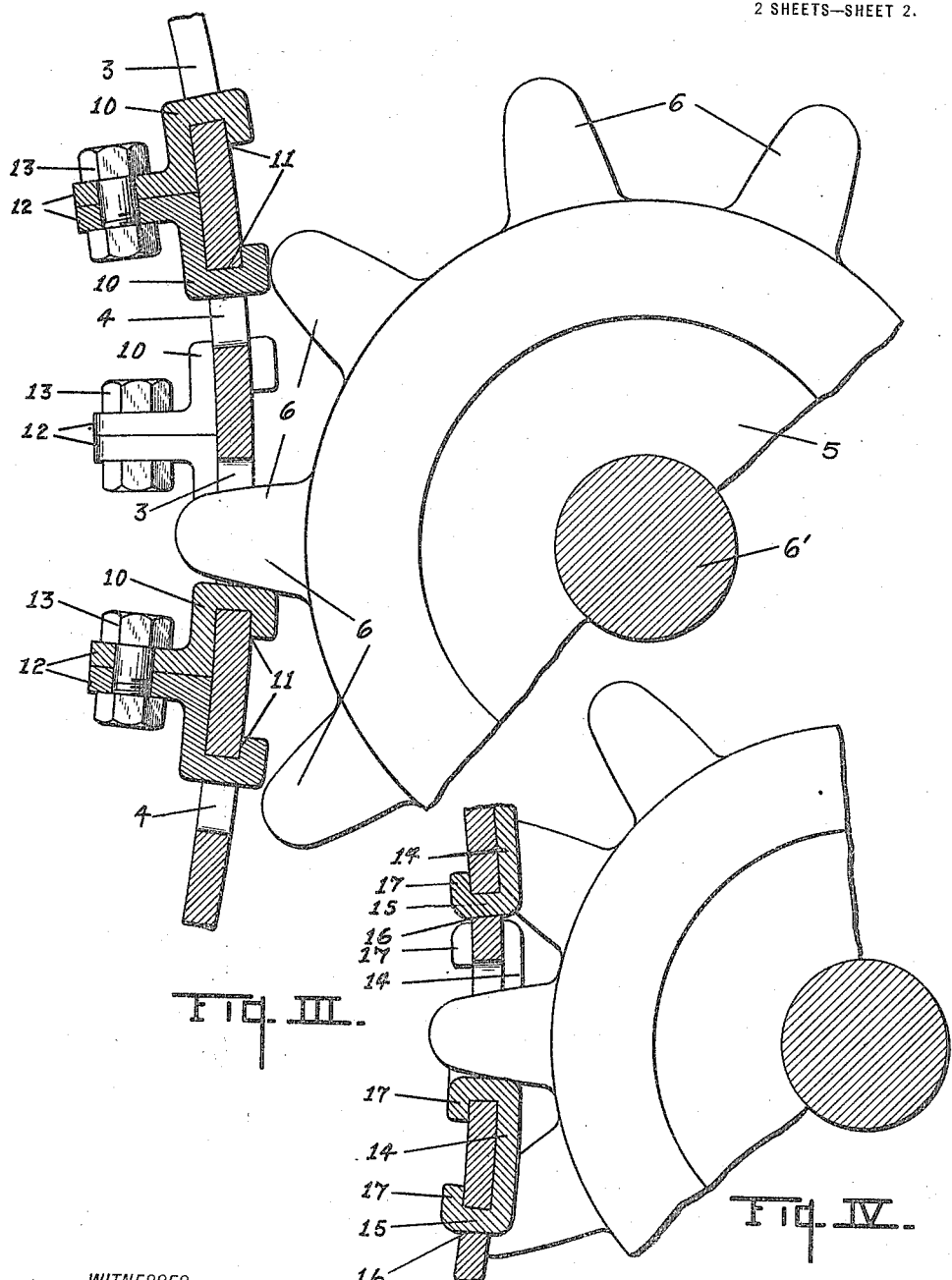

UNITED STATES PATENT OFFICE.

JUSTUS S. STEARNS, OF LUDINGTON, MICHIGAN, ASSIGNOR TO GILE BOAT & ENGINE CO., OF LUDINGTON, MICHIGAN.

TRACTOR DRIVING-GEARING.

1,196,168.      Specification of Letters Patent.      Patented Aug. 29, 1916.

Application filed July 15, 1915. Serial No. 40,068.

*To all whom it may concern:*

Be it known that I, JUSTUS S. STEARNS, a citizen of the United States, residing at Ludington, Michigan, have invented certain new and useful Improvements in Tractor Driving-Gearing, of which the following is a specification.

This invention relates to improvements in tractor driving gearing.

The main objects of this invention are to provide an improved tractor driving gearing in which the power is effectively applied to the traction wheels and one in which there are no large toothed gears.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a detail plan view of a structure embodying the features of my invention. Fig. II is a side elevation of the parts shown in Fig. I. Fig. III is an enlarged detail view, the rim of the tractor wheel being shown partially sectioned. Fig. IV is a similar view of a slightly modified structure, the modification being in the form of the wear member.

In the drawing similar reference numerals refer to similar parts throughout the several views.

In the accompanying drawing I have shown only one traction wheel of a tractor as that is sufficient to illustrate my improvements. The arrangement of the other parts relative to the traction wheels will be readily understood.

The traction wheel, designated generally by the numeral 1, is provided with a rim 2 having a series of gear tooth holes 3 therethrough disposed in a zig-zag relation and a corresponding series of wear member holes 4, the wear member holes being disposed at the rear of the gear tooth holes and in a spaced relation thereto. The driving gear 5 is provided with zig-zag spur teeth 6 and is arranged on the outside of the tractor wheel, so that these teeth mesh with the gear tooth holes 3. The driving shaft 6' of the driving gear 5 is, in the structure illustrated, provided with a gear 7 meshing with the pinion 8 on the transmission shaft 9. The details of the transmission are not of importance to the present invention. The gear tooth holes 3 are provided with wear members, preferably consisting of sections 10 having facing recesses 11 fitting the rear edges of the gear tooth holes and the front edges of the succeeding wear member holes, as shown in detail in Fig. III. The wear member sections 10 are provided with upwardly projecting lugs 12 perforated to receive the clamping bolts 13. Thus arranged the wear members can be readily applied or reversed as occasion may require so that both sections are presented for wear.

In the modification shown in Fig. IV the wear members 14 are formed in one piece, the ends 15 engaging the holes 16 being bendable so that the portions 17 may be bent up to secure the wear members in place after the ends are inserted through the holes. The wearing ends of these wear members are preferably hardened. In the form shown in Fig. IV both sections are hardened so that the wear members may be reversed. The gear tooth holes 3 extend entirely through the rim and do not become clogged because any dirt that may collect therein is punched through by the gear teeth 6.

By my improvements I obviate the necessity for the large driven gear usually attached to the tractor wheel, and by driving from the periphery the maximum amount of power is secured. I have illustrated and described my improvements in detail in a preferred embodiment and shown a modification in the form of the clips. I have not illustrated or described other variations which I contemplate as I believe the disclosure made will enable those skilled in the art to which my invention relates to embody or adapt the same as may be desired.

Having thus described my invention what I claim as new and desire to secure by Letters Patent, is:

1. In a tractor driving gearing, the combination of a traction wheel comprising a rim having a series of gear tooth holes therethrough and a corresponding series of wear member holes spaced from said gear tooth holes, wear members formed of sections having facing recesses fitting the rear edges of the gear tooth holes and the front edges of the succeeding wear member holes, said sections being provided with inwardly projecting lugs perforated to receive clamping bolts, clamping bolts for detachably securing said wear members, and a driving gear disposed on the outside of said traction wheel and having spur teeth coacting with said gear tooth holes of said traction wheel rim.

2. In a tractor driving gearing, the combination of a traction wheel comprising a rim having a series of gear tooth holes therethrough disposed in a ziz-zag relation, and a corresponding series of wear member holes spaced from said gear tooth holes, wear members having facing recesses fitting the rear edges of the gear tooth holes and the front edges of the succeeding wear member holes, and a driving gear disposed on the outside of said traction wheel and having staggered spur teeth coacting with said gear tooth holes of said traction wheel rim.

3. In a tractor driving gearing, the combination of a traction wheel comprising a rim having a series of gear tooth holes therethrough and a corresponding series of wear member holes spaced from said gear tooth holes, wear members having facing recesses fitting the rear edges of the gear tooth holes and the front edges of the succeeding wear member holes, and a driving gear disposed on the outside of said traction wheel and having spur teeth coacting with said gear tooth holes of said traction wheel rim.

4. In a tractor driving gearing, the combination of a traction wheel comprising a rim having a series of gear tooth holes therethrough and a corresponding series of wear member holes spaced from said gear tooth holes, wear members engaged over adjacent edges of adjacent gear tooth and wear member holes, and a driving gear having spur teeth coacting with said gear tooth holes.

In witness whereof, I have hereunto set my hand and seal in the presence of two witnesses.

JUSTUS S. STEARNS. [L. S.]

Witnesses:
　JOHN FRALEY,
　CARL T. LESTER.

Copies of this patent may be obtained for five cents each, by addressing the "Commissioner of Patents, Washington, D. C."